US008676897B1

(12) United States Patent
Davis et al.

(10) Patent No.: US 8,676,897 B1
(45) Date of Patent: Mar. 18, 2014

(54) N-WAY INTERACTIVE COMMUNICATION USING HAND HELD COMPUTERS

(75) Inventors: Mark T. Davis, San Francisco, CA (US); Eric Klein, Cupertino, CA (US); Timothy D. Twerdahl, Los Altos, CA (US); David Kammer, Seattle, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 808 days.

(21) Appl. No.: 10/008,767

(22) Filed: Nov. 30, 2001

(51) Int. Cl.
G06F 15/16 (2006.01)

(52) U.S. Cl.
USPC .......................................... 709/206; 709/204

(58) Field of Classification Search
USPC ......... 709/200–207, 219–225, 238–244, 248; 715/758, 751, 753; 455/466
See application file for complete search history.

(56) References Cited

U.S. PATENT DOCUMENTS

| | | | |
|---|---|---|---|
| 5,010,547 A | 4/1991 | Johnson | |
| 5,012,219 A | 4/1991 | Henry | |
| 5,075,684 A | 12/1991 | DeLuca | |
| 5,359,317 A | 10/1994 | Gomez | |
| 5,394,140 A | 2/1995 | Wong | |
| 5,430,436 A | 7/1995 | Fennell | |
| 5,612,682 A | 3/1997 | DeLuca | |
| 5,650,776 A | 7/1997 | Mitchell | |
| 5,705,995 A | 1/1998 | Laflin | |
| 5,903,852 A | 5/1999 | Schaupp, Jr. | |
| 5,958,006 A | 9/1999 | Eggleston | |
| 5,978,835 A * | 11/1999 | Ludwig et al. | 709/204 |
| 5,999,208 A * | 12/1999 | McNerney et al. | 348/14.08 |
| 6,157,630 A | 12/2000 | Adler | |
| 6,192,395 B1 * | 2/2001 | Lerner et al. | 709/204 |
| 6,219,698 B1 * | 4/2001 | Iannucci et al. | 709/221 |
| 6,476,825 B1 * | 11/2002 | Croy et al. | 715/716 |
| 6,484,196 B1 * | 11/2002 | Maurille | 709/206 |
| 6,609,147 B1 * | 8/2003 | Matsuda et al. | 709/205 |
| 6,654,790 B2 * | 11/2003 | Ogle et al. | 709/206 |
| 6,690,918 B2 * | 2/2004 | Evans et al. | 455/41.2 |
| 6,713,308 B1 * | 3/2004 | Lu et al. | 436/514 |
| 6,714,793 B1 * | 3/2004 | Carey et al. | 455/466 |
| 6,741,856 B2 * | 5/2004 | McKenna et al. | 455/422.1 |
| 7,974,260 B2 * | 7/2011 | Kuhl et al. | 370/348 |
| 2002/0025839 A1 * | 2/2002 | Usui | 455/574 |
| 2002/0122410 A1 * | 9/2002 | Kulikov et al. | 370/349 |
| 2002/0174248 A1 * | 11/2002 | Morriss | 709/238 |
| 2002/0184391 A1 * | 12/2002 | Phillips | 709/248 |
| 2003/0208541 A1 * | 11/2003 | Musa | 709/205 |
| 2005/0101338 A1 * | 5/2005 | Kraft | 455/466 |
| 2007/0282733 A1 * | 12/2007 | May | 705/37 |

* cited by examiner

Primary Examiner — Jason Recek

(57) ABSTRACT

A method and apparatus for collaborative chatting on a plurality of hand held computer systems are disclosed. A Bluetooth communication may be established among several hand held computer systems. A participants list may be cached from previous sessions, eliminating a typical step of discovery. Collaborative chatting software may be automatically initiated on the hand held systems in the group. Information entered by any member of the group may be displayed in substantially real time on all hand held computer systems. Information may be color coded to identify its source. In this novel manner, collaborative chatting on a plurality of hand held computer systems may occur, resulting in richer, more efficient and more secure communication between group members.

22 Claims, 25 Drawing Sheets

N-WAY INTERACTIVE COMMUNICATION USING HAND HELD COMPUTERS

FIELD OF THE INVENTION

Embodiments of the present invention relate to hand held computer systems. More particularly, embodiments of the present invention provide a method and apparatus for collaborative communication among several wireless computer systems, for example hand held computers.

BACKGROUND ART

It is often desirable to communicate or "talk" with others in a quiet or discrete manner. There are many situations in which people may desire to communicate with one another, but actual verbal talking is inappropriate. For reasons of etiquette, security, negotiation strategy or language, it may be required to communicate in a discrete manner.

For example, it is generally not acceptable in an office environment to yell a message to someone 30 feet distant. Such a communication would disrupt everyone in the area. Further, a loud voice is generally disturbing.

One or more parties to a desired communication may already be in a verbal conversation with others, for example on the phone or in a meeting. It is frequently desirable to have a "side conversation" among some, but not all, participants in a meeting. Passing notes is a well known response to that scenario. Another well known technique is to whisper.

Many people, however, find such prior art techniques lacking. Passing notes or whispering are generally considered rude. Further, they may serve to attract unwanted attention to a private conversation. A traditional method may also lack a desired level of privacy or security.

A high tech version of talking among a subset of meeting participants has emerged in recent years. Meeting participants may use two-way pagers or the SMS features of mobile phones to message one another. With the advent of wireless internet connectivity, it is even possible to send email among participants in a meeting.

These high tech methods are also found to be insufficient. They generally rely on wide area infrastructure, which is frequently public. Messages are thus dispersed over geographically dispersed areas, allowing numerous points for interception. Public infrastructures additionally incur costs, often on a per-message or per size of message basis.

What is needed, therefore, is a means for silent communication that is discrete, secure, and has a limited geographic footprint.

Unfortunately, methods for discrete communication with these benefits have not been available in the prior art.

SUMMARY OF THE INVENTION

Therefore, it would be advantageous to provide a method and system for collaborative communication among several hand held computer systems. A further need exists for a method to identify the contributions of several collaborators. A still further need exists for a controlling participation in a collaborative chat session.

Embodiments of the present invention provide a method and system for collaborative chatting among several hand held computer systems. Further embodiments implement a method to identify the contributions of several collaborators. Still other embodiments may control participation in a collaborative chat session.

A method and apparatus for collaborative chatting on a plurality of hand held computer systems are disclosed. A Bluetooth communication may be established among several hand held computer systems. A participants list may be cached from previous sessions, eliminating a typical step of discovery. Collaborative chatting software may be automatically initiated on the hand held systems in the group. Information entered by any member of the group may be displayed in substantially real time on all hand held computer systems. Information may be color coded to identify its source. In this novel manner, collaborative chatting on a plurality of hand held computer systems may occur, resulting in richer, more efficient and more secure communication between group members.

DETAILED DESCRIPTION OF THE INVENTION

Figure 1:
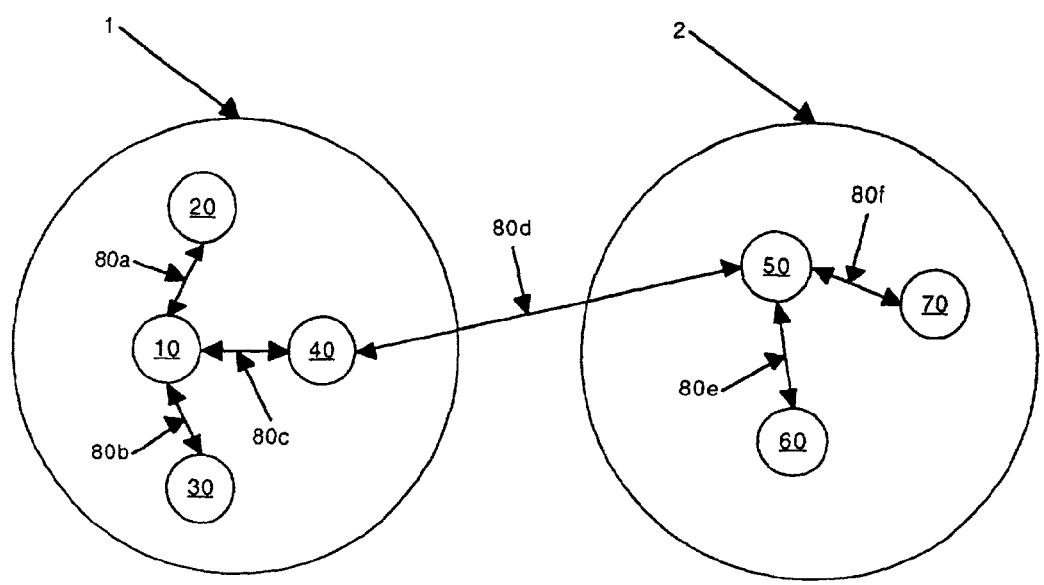
FIG. 1 illustrates a topology of a network of devices coupled using wireless connections in accordance with one embodiment of the present invention.

In the following detailed description of the present invention, N-WAY INTERACTIVE communication USING HAND HELD COMPUTERS, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions which follow (e.g., processes 700 and 800) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "scrolling" or "displaying" or "recognizing" or "generating" or "erasing" or "transferring" or "establishing" or "chat" or "updating" or "initiating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

N-way Interactive Communication Using Hand Held Computers

The present invention is described in the context of a hand held computer system. However, it is appreciated that the present invention may be utilized in other types of portable electronic devices where it may be desirable to share information in a graphical form.

Bluetooth is the trade name for a technology specification for small form factor, low-cost, short-range radio links between personal computers (PCs), hand held computers, mobile phones and other devices and appliances. However, it is appreciated that the present invention may be utilized with devices and systems compliant with standards different from Bluetooth, such as the IEEE (Institute of Electronic and Electrical Engineering) 802.11 standard.

The Bluetooth technology allows cables that typically connect one device to another to be replaced with short-range radio links. Bluetooth is targeted at mobile and business users who need to establish a link, or small network, between their computer, cellular phone and other peripherals. The required and nominal range of Bluetooth is thus set to approximately ten (10) meters. To support other uses, for example the home environment, Bluetooth can be augmented to extend the range to up to 100 meters.

The Bluetooth technology is based on a high-performance, yet low-cost, integrated radio transceiver. For instance, Bluetooth transceivers built into both a cellular telephone and a hand held computer system would replace the cables used today to connect a hand held to a cellular telephone. Bluetooth radio technology can also provide a universal bridge to existing data networks, a peripheral interface, and a mechanism to form small private ad hoc groupings of connected devices away from fixed network infrastructures.

FIG. 1 illustrates a topology of a network of devices coupled using wireless connections in accordance with one embodiment of the present invention. In the parlance of Bluetooth, a collection of devices connected in a Bluetooth system are referred to as a "piconet" or a "subnet." In the present embodiment, a piconet starts with two connected devices, and may grow to eight connected devices. All Bluetooth devices are peer units; however, when establishing a piconet, one unit will act as a master and the other(s) as slave(s) for the duration of the piconet connection.

A Bluetooth system supports both point-to-point and point-to-multi-point connections. Several piconets can be established and linked together in a "scatternet," where each piconet is identified by a different frequency hopping sequence. All devices participating on the same piconet are synchronized to their respective hopping sequence.

Accordingly, devices 10, 20, 30 and 40 are coupled in piconet 1 using wireless connections 80*a-c*. Similarly, devices 50, 60 and 70 are coupled in piconet 2 using wireless connections 80*e-f*. Piconet 1 and piconet 2 are coupled using connection 80*d*, which may be wireless or carried over another type of network. Devices 10-70 can be printers, personal digital assistants (PDAs), desktop computer systems, laptop computer systems, cell phones, fax machines, keyboards, and joysticks equipped with a Bluetooth radio transceiver or adapted to communicate with Bluetooth devices ("Bluetooth-enabled"). In accordance with the present invention, devices 10-70 can also be virtually any type of device, including mechanical devices and appliances, equipped with a Bluetooth radio transceiver or Bluetooth-enabled. The Bluetooth radio transceiver may be integrated into the device, or it may be coupled to the device.

Figure 2:
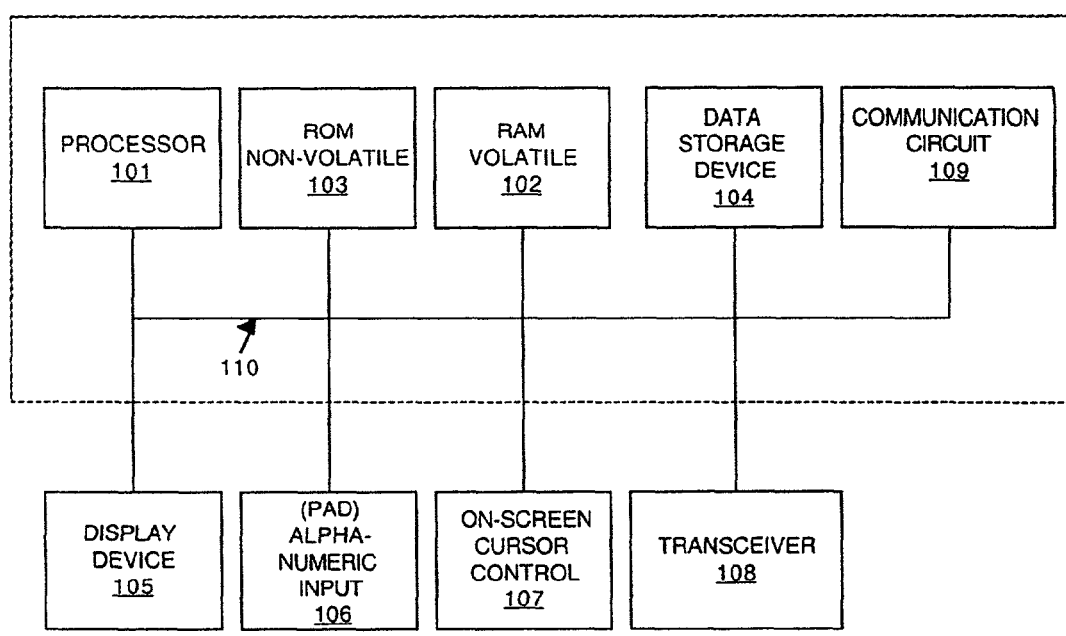
FIG. 2 is a block diagram of a portable computer system upon which embodiments of the present invention can be implemented.

FIG. 2 is a block diagram of a portable computer system 100 (e.g., a PDA, a hand-held computer system, or palmtop computer system) upon which embodiments of the present invention can be implemented. Computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Computer system 100 also includes an optional peripheral expansion device 104 (e.g., secure digital card, memory stick, compact flash, PCMCIA) coupled with the bus 110 for storing information, instructions and adding function (for example a Bluetooth communications subsystem) to a host device. Peripheral expansion device 104 can be removable.

Computer system 100 also contains a display device 105 coupled to the bus 110 for displaying information to the computer user. The display device 105 utilized with computer system 100 may be a liquid crystal display device, a cathode ray tube (CRT), a field emission display device (also called a flat panel CRT) or other display device suitable for generating graphic images and alphanumeric characters recognizable to the user. In the preferred embodiment, display device 105 is a flat panel display.

Computer system 100 also includes a cursor control or directing device (on-screen cursor control 107) coupled to bus 110 for communicating user input information and command selections to processor 101. In one implementation, on-screen cursor control device 107 is a touch-screen device incorporated with display device 105. On-screen cursor control device 107 is capable of registering a position on display device 105 where a stylus makes contact.

Also included in computer system 100 of FIG. 2 is an input device 106 that in one implementation is a stroke or character recognition pad (e.g., a "digitizer"). Input device 106 can communicate information and command selections to processor 101. Input device 106 is capable of registering a position where a stylus (or an element having the functionality of a stylus) makes contact. Input device 106 also has the capability of registering movements of a stylus (or an element having the functionality of a stylus) across or above the surface of input device 106.

In accordance with the present invention, in one embodiment, a stylus can be used for making a stroke or inscribing a character on the surface of input device 106. The stroke or character information is then fed to a processor 101 for automatic character recognition. Once the stroke or character information is recognized, it can be displayed on display device 105 for verification and/or modification.

With reference still to FIG. 2, transceiver 108 is coupled to bus 110 and enables computer system 100 to communicate wirelessly with other electronic devices coupled in a piconet or scatternet (refer to FIG. 1). It should be appreciated that within the present embodiment, transceiver 108 is coupled to an antenna and provides the functionality to transmit and receive information over a wireless communication interface. In one embodiment, transceiver 108 is a Bluetooth device. Additional information with regard to the Bluetooth embodiment is provided in conjunction with FIGS. 4A and 4B. It is appreciated that transceiver 108 may be incorporated in peripheral expansion device 104.

Figure 3:
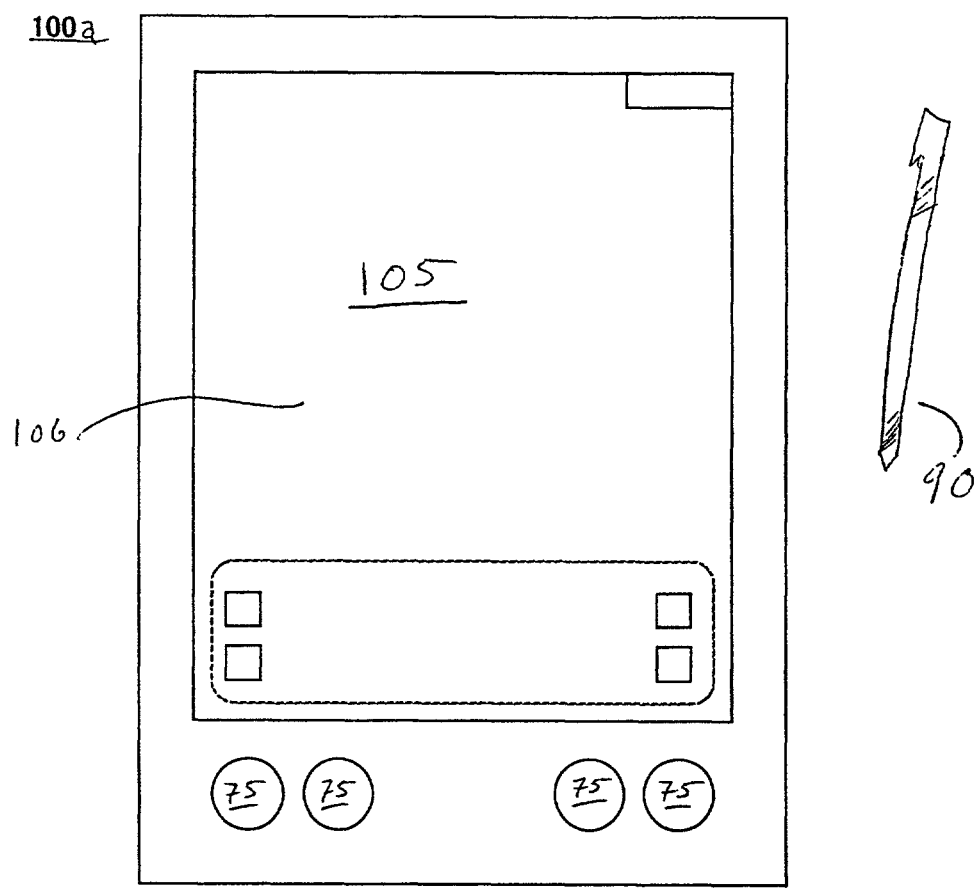
FIG. 3 is an illustration of the top-side face of one embodiment of a portable computer system 100 in accordance with the present invention.

FIG. 3 is an illustration of the top-side face 100a of one embodiment of the portable computer system 100 (FIG. 2) in accordance with the present invention. The top-side face 100a contains one or more dedicated and/or programmable buttons 75 for selecting information and causing the computer system to implement functions.

In the present embodiment, the top-side face 100a contains a display device 105 typically surrounded by a bezel or cover. A removable stylus element 90 is also shown. The display device 105 is a touch screen capable of registering contact between the screen and the tip of the stylus element 90. The top-side face 100a also contains an input device 106 that in one implementation is a stroke or character recognition pad. Input device 106 is a touch screen type of device capable of registering contact with a tip of stylus element 90, and also can register movements of the stylus element. The stylus element 90 can be of any shape and material to make contact with the display device 105 and input device 106.

Figure 4A:
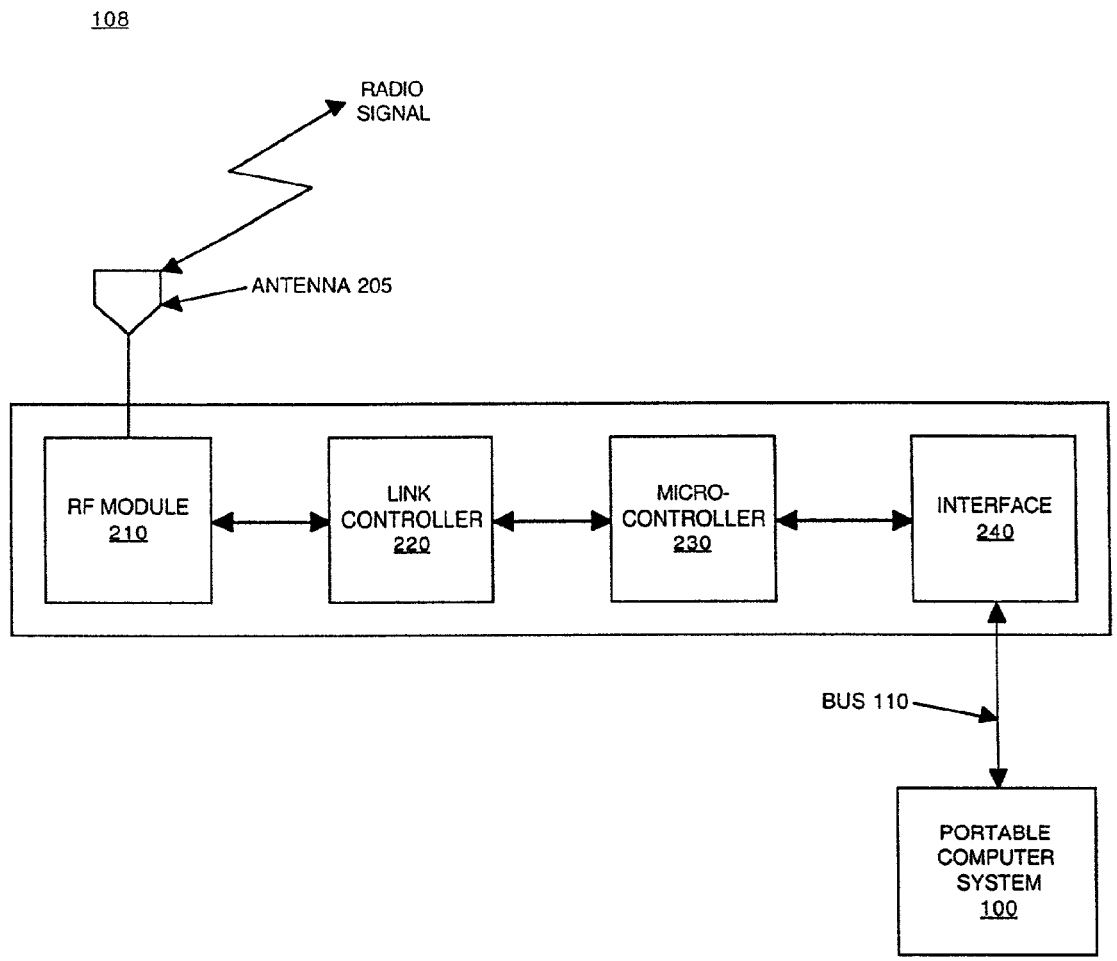
FIGS. 4A and 4B are block diagrams of one embodiment of a transceiver in accordance with the present invention.
Figure 4B:
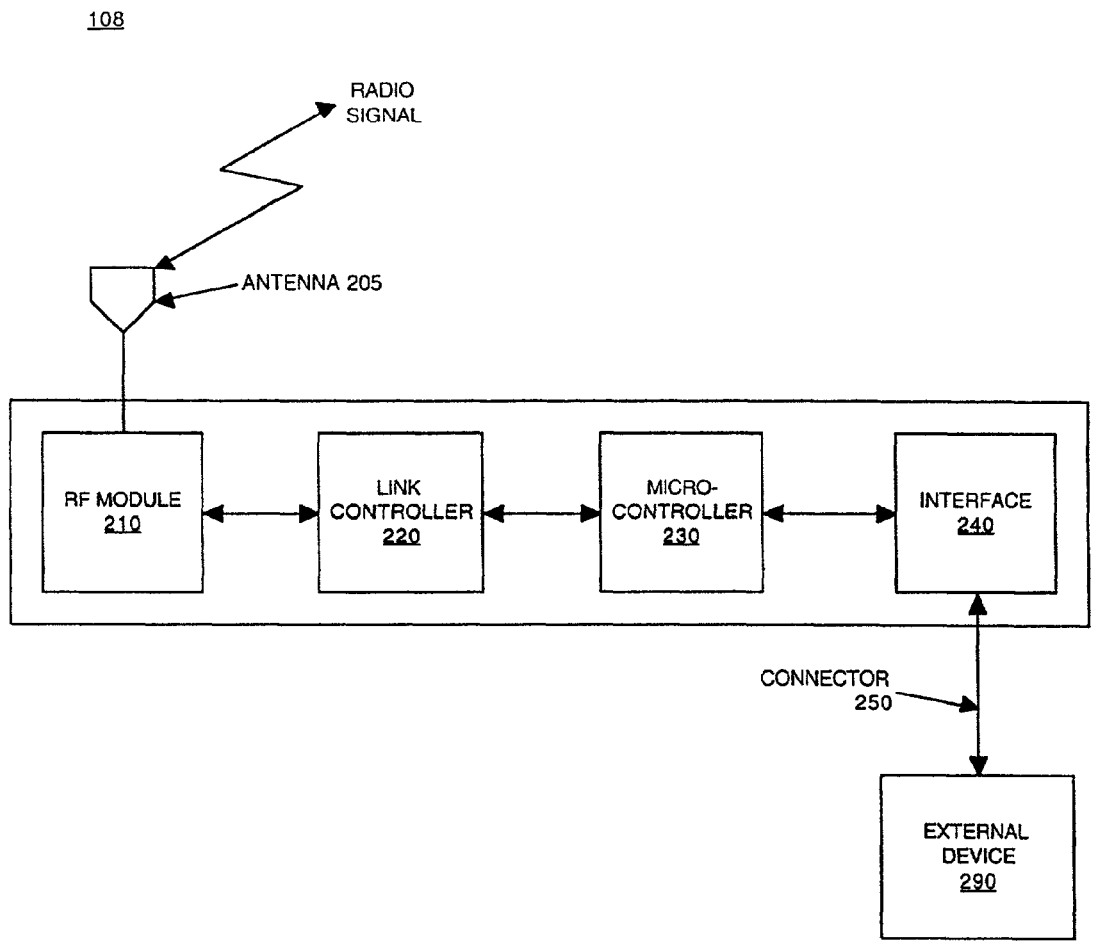

FIGS. 4A and 4B are block diagrams of one embodiment of a transceiver 108 in accordance with the present invention. In a preferred embodiment (the "Bluetooth embodiment"), transceiver 108 is a Bluetooth device comprising a digital component (e.g., a Bluetooth controller) and an analog component (e.g., a Bluetooth radio). In accordance with the present invention, a transceiver 108 is coupled via a system bus 110 to a system or device that will be used to control remote devices (e.g., portable computer system 100 of FIG. 2). Similarly, a transceiver 108 is coupled via a connector 250 to each remote device that is to be controlled (e.g., external device 290).

With reference to both FIGS. 4A and 4B, in the present embodiment, transceiver 108 comprises an antenna 205 for receiving or transmitting radio signals, a radio frequency (RF) module 210, a link controller 220, a microcontroller (or central processing unit) 230, and an external interface 240.

In the Bluetooth embodiment, RF module 210 is a Bluetooth radio. Bluetooth radios operate in the ISM (Industrial, Scientific Medical) band at 2.4 GHz. A frequency hop transceiver is applied to combat interference and fading. Bluetooth uses a packet-switching protocol based on a frequency hop scheme with 1600 hops/second. Slots can be reserved for synchronous packets. A packet nominally covers a single slot, but can be extended to cover up to five slots. Each packet is transmitted in a different hop frequency. The entire available frequency spectrum is used with 79 hops of one (1) MHz bandwidth, defined analogous to the IEEE 802.11 standard. The frequency-hopping scheme is combined with fast ARQ (Automatic Repeat Request), cyclic redundancy check (CRC) and Forward Error Correction (FEC) for data.

In the present embodiment, link controller 220 is a hardware digital signal processor for performing baseband processing as well as other functions such as Quality-of-Service, asynchronous transfers, synchronous transfers, audio coding, and encryption.

In one embodiment, microcontroller 230 is an application specific integrated circuit (ASIC). In the Bluetooth embodiment, microcontroller 230 is a separate central processing unit (CPU) core for managing transceiver 108 and for handling some inquiries and requests without having to involve the host device. In the Bluetooth embodiment, microcontroller 230 runs software that discovers and communicates with other Bluetooth devices via the Link Manager Protocol (LMP). The LMP provides a number of services including sending and receiving of data, inquiring of and reporting a name or device identifier, making and responding to link address inquiries, connection setup, authentication, and link mode negotiation and setup. The LMP also can be used to place transceiver 108 in "sniff" mode, "hold" mode, "park" mode or "standby" mode (refer to FIG. 5 below).

With reference still to FIGS. 4A and 4B, in the present embodiment, interface 240 is for coupling transceiver 108 to portable computer system 100 or to external device 290 in a suitable format (e. g., Secure Digital Card, Memory Stick USB, PCMCIA, PCI, CardBus, PC Card, etc.). In the present embodiment, interface 240 runs software that allows transceiver 108 to interface with portable computer system 100 or external device 290.

Figure 5:
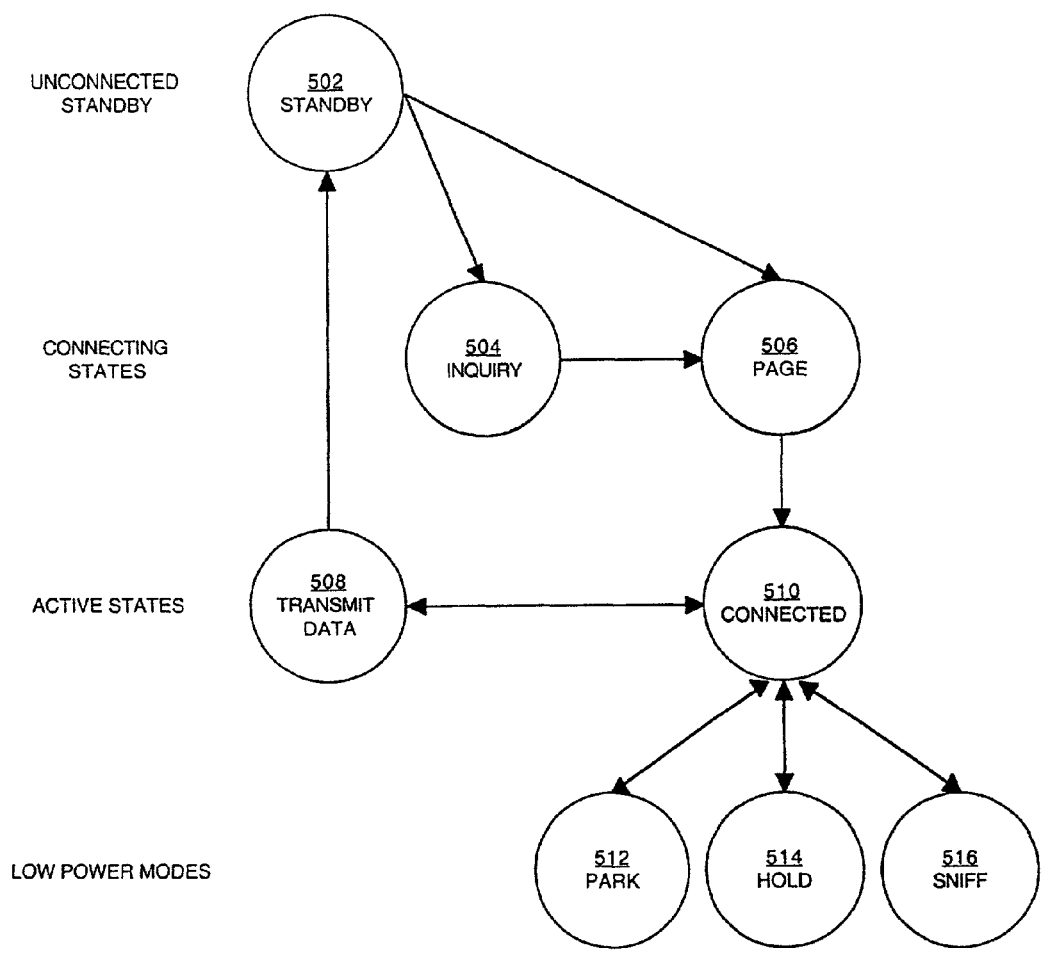
FIG. 5 illustrates the different operating modes of a wireless transceiver in accordance with one embodiment of the present invention.

FIG. 5 illustrates the different operating modes of a wireless transceiver 108 (FIGS. 4A and 4B) in accordance with one embodiment of the present invention. In the Bluetooth embodiment, before any connections between Bluetooth devices are created, all devices are in standby mode (502). In this mode, an unconnected unit "listens" for messages at a regular rate (e.g., every 1.28 seconds) on a set of hop frequencies defined for that unit. The hold mode (514) is a power saving mode that can be used for connected units if no data need to be transmitted. The sniff mode (516) and park mode (512) are also low power modes. In the sniff mode, a device listens to the piconet at a reduced rate (relative to the regular rate), thus reducing its duty cycle. The sniff interval is programmable and depends on the application. In the park mode, a device is still synchronized to the piconet but does not participate in the traffic.

A connection between devices is made by a "page" message (506) if the address is already known, or by an "inquiry" message (504) followed by a subsequent page message if the address is unknown. When connected (510), data can be transmitted (508) between devices.

Figure 6:
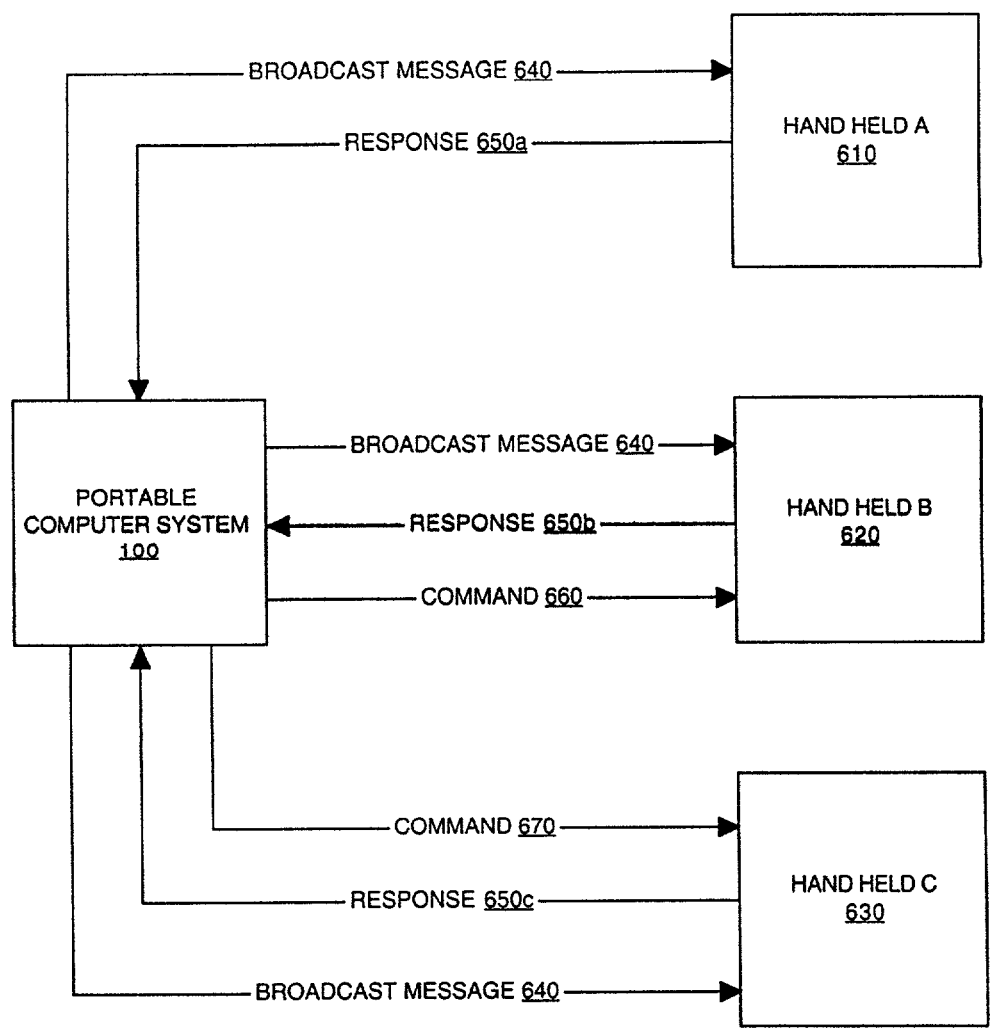
FIG. 6 illustrates a communication flow between Bluetooth compatible devices, according to an embodiment of the present invention.

FIG. 6 illustrates a communication flow between Bluetooth compatible devices, according to an embodiment of the present invention. When it is necessary or desirable to locate and identify compliant devices, a portable computer system, for example hand held computer system 100, may transmit a broadcast message 640 (e.g., an inquiry 504) that is received by compliant devices 610-630, for example, other Bluetooth-enabled hand held computer systems. For example, a user with portable computer system 100 enters a room containing compliant devices 610-630. Portable computer system 100, either automatically or in response to a user input, transmits broadcast message 640 for the purpose of discovering compliant devices in the room.

As compliant devices, hand held computers 610-630 respond to broadcast message 640 via responses 650*a*, 650*b* and 650*c*, respectively. In the present embodiment, responses 650*a-c* include the Medium Access Control (MAC) address for remote devices 610-630. Typically, each remote device is assigned a temporary MAC address for the duration of the connection. All communications between portable computer system 100 and a remote device carry the MAC address of the remote device. Responses 650*a-c* can also include information characterizing, for example, the type and capabilities of each remote device. This information may include an identifier that can be used by portable computer system 100 to characterize the other devices based on information stored in a database or lookup table.

In the present embodiment, when a connection between portable computer system 100 and another hand held computer, for example hand held A 610, has already been established, or when the MAC address of the remote device is known, broadcast message 640 may be a page message 506 (FIG. 5) instead of an inquiry 504.

Figure 7:
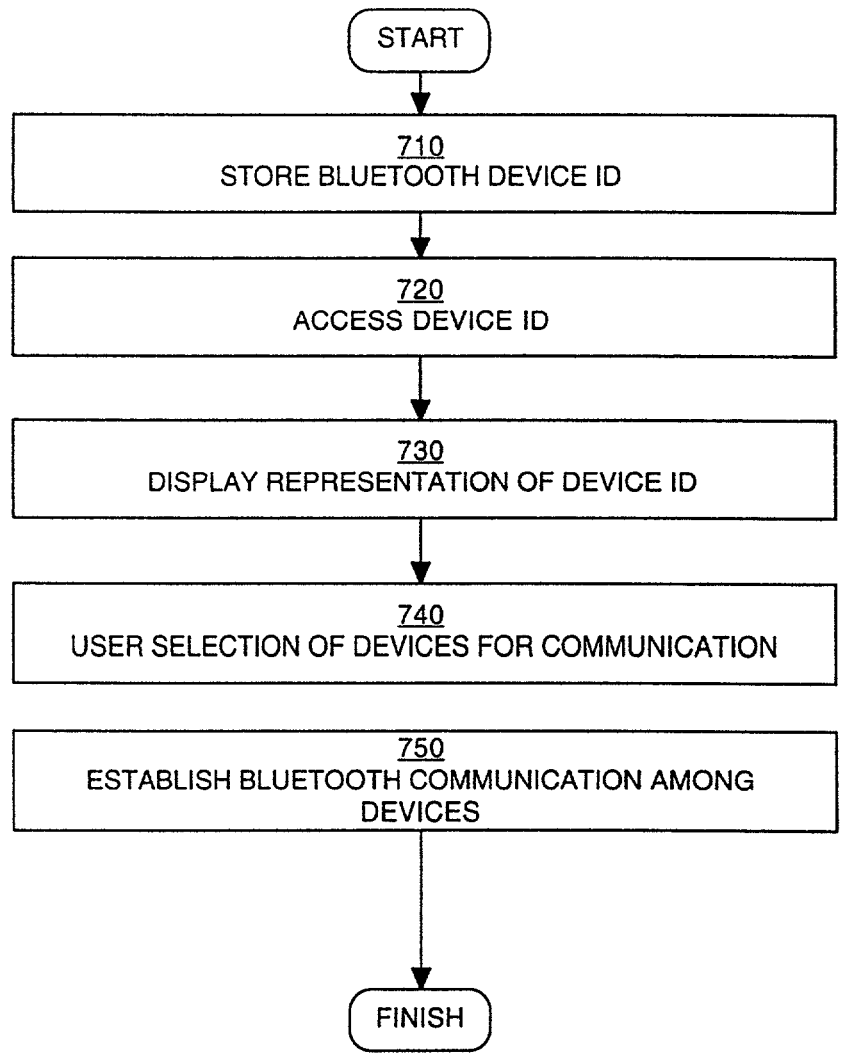
FIG. 7 is a flow diagram of a process for a method of establishing a Bluetooth wireless connection between hand held computers, according to an embodiment of the present invention.

FIG. 7 is a flow diagram of a process 700 for a method of establishing a Bluetooth wireless connection between hand held computers, according to an embodiment of the present invention.

In step 710, a Bluetooth device identification is stored in a hand held computer system. The identification may have been determined automatically in a previous communication, as discussed above in relation to FIG. 6. The device identification may also be entered manually by a user.

In step 720, the device identification previously stored is accessed. It is appreciated that other steps and other processes, not associated with process 700 may take place between steps 710 and 720.

Figure 11:
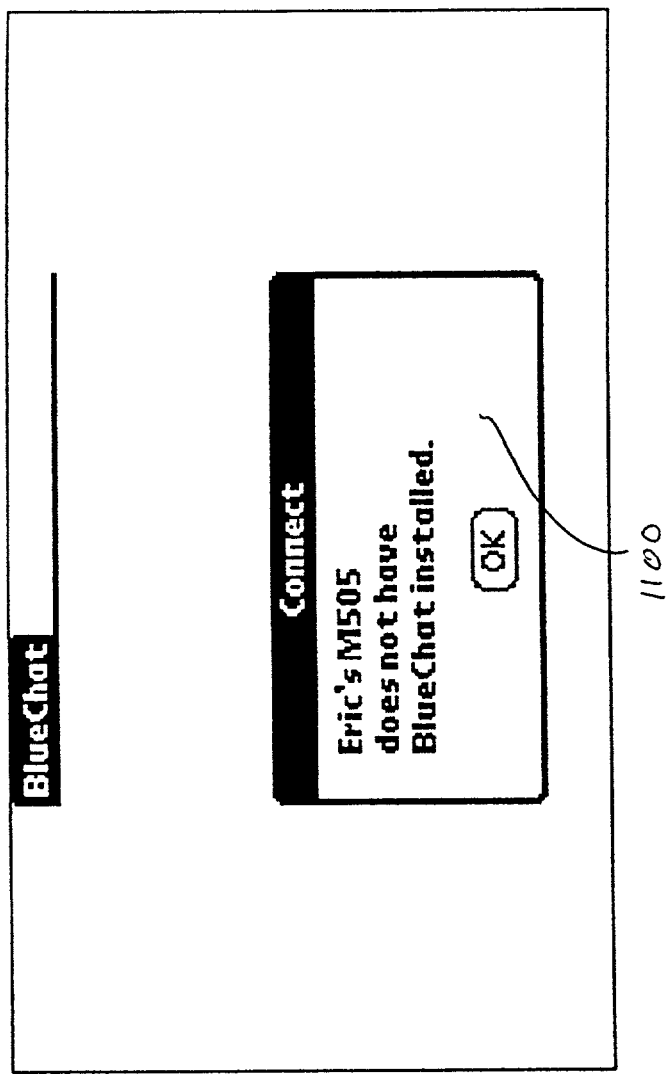
FIG. 11 shows an error dialog, according to an embodiment of the present invention.

In optional step 730, the device id, or a representation of the id, e. g., a "friendly name" which may be associated with a device identification by a user, may be displayed. In optional step 740, a user may be able to select whether to include a particular device identification (or representation thereof) in a Bluetooth communication. The selection may take the form of checking a box drawn on the display, as shown in FIG. 11.

In step 750, the Bluetooth connection may be established without using an inquiry message, for example inquiry 504 of FIG. 5.

Importantly, the Bluetooth connection may not be a part of a piconet, but rather a point to point connection, according to an embodiment of the present invention. A point to point connection has an advantage in this application in that a first user may join or leave a communication without affecting other users not involved in communication with the first user. In a typical Bluetooth piconet, if one user leaves, the piconet may be disrupted, thereby interrupting communication between remaining members that may have desired to remain in communication.

Figure 8:
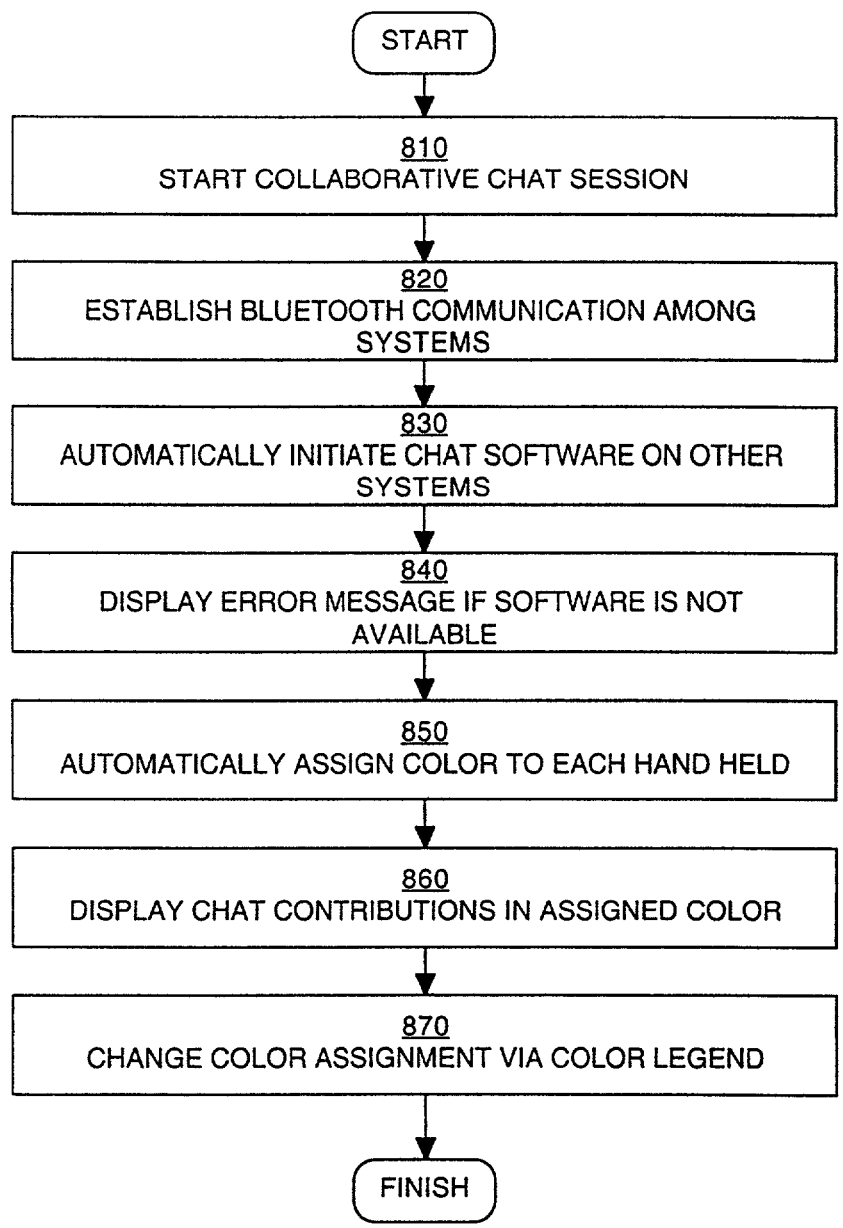
FIG. 8 is a flow diagram of a process for a method of identifying the source of a communication, according to an embodiment of the present invention.

FIG. 8 is a flow diagram of a process 800 for a method of identifying the source of a communication, according to an embodiment of the present invention.

In step 810, a collaborative chat session may be started on a first hand held computer system, for example by a host user. The host user may be determined by being the first to press a share button.

Herein, chat or chat information includes a communication of textual or other descriptive or symbolic expression for communication ideas or description. One such example is text based information, e.g., in ASCII coded text, being alphanumeric in nature. Chat may also include emoticons or other graphical symbols used similarly to characters, for example the graphical characters described in relation to FIG. 18, below.

In step 820, a Bluetooth communication may be established between the first hand held computer system and other hand held computer systems.

In step optional step 830, a message may be sent to the several hand held computers comprising the communication to automatically initiate a collaborative chat software.

In optional step 840, an error message may be displayed if one of the hand held computer systems does not have the proper software. In addition, a message may be displayed instructing a user how to get the proper software, for example to download it from a website, or to have another member of the group "beam" (transfer via infrared signals) the software.

In step 850, a color may be automatically assigned to each hand held computer system comprising the communication.

In step 860, information, for example a communication element, from each hand held computer system is displayed in the color assigned to that hand held computer system. For example, if the host is assigned black, then all other hand held computer systems may display communication elements entered by the host in black. Likewise, if a second hand held computer system is assigned red, its communication contributions will be displayed in red.

Figure 21:
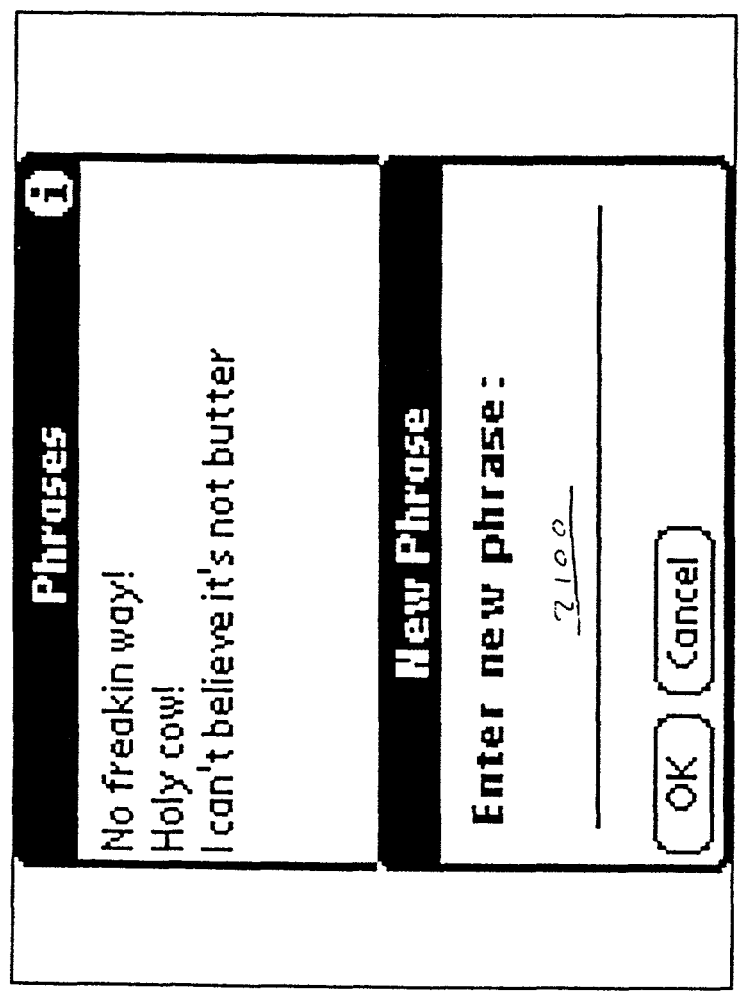
FIG. 21 illustrates a new phase dialog, according to an embodiment of the present invention.

In optional step 870, a user may change the color assignment, for example via color palette 2110 of FIG. 21, further described below.

Importantly, a hand held computer system with a monochrome display may not display color palette 2110.

Figure 9:
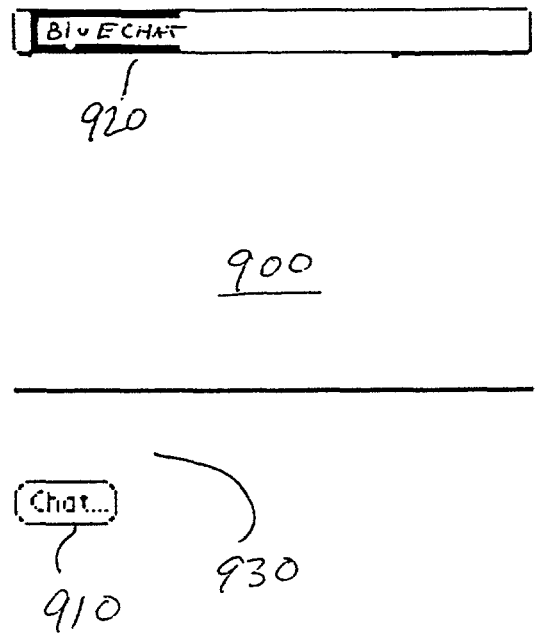
FIG. 9 shows an initial display screen image of a collaborative chat software, according to an embodiment of the present invention.

FIG. 9 shows an initial display screen image 900 of a chat software, according to an embodiment of the present invention. Image 900 may be displayed on display device 105 of system 100. Image 900 may contain a button rendered on display device 105, for example chat button 910. Image 900 may also include title area 920. Title area 920 may also function as a button to activate a menu display. Image 900 may include input area 930. A touch action, for example stylus 90 pressing on digitizer 106, may initiate an action associated with a button. Input area 930 may recognize stroke gestures as characters for input into system 100.

According to an embodiment of the present invention, when collaborative chat software is initialized, users may be presented with the blank chat area illustrated in FIG. 9.

The first user to select the Chat button 910 may be assigned the role of host. The host may invite other chat software users or "partners" to join in separate conversations. According to embodiments of the present invention, a single user may be limited to communication with a maximum of three other users.

According to embodiments of the present invention, if chat software is being run for the first time and/or there is no stored list of recent contributors, tapping Chat button 910 may cause hand held system 100 to discover all handhelds within range. The potential partners discovered are displayed in FIG. 10.

If the host has previously collaborated using chat software, a Connect dialog may display a list of their recent partners from previous chat sessions. This speeds the setup process when a user is consistently working with a small group, as the Bluetooth discovery process is not needed.

Figure 10:
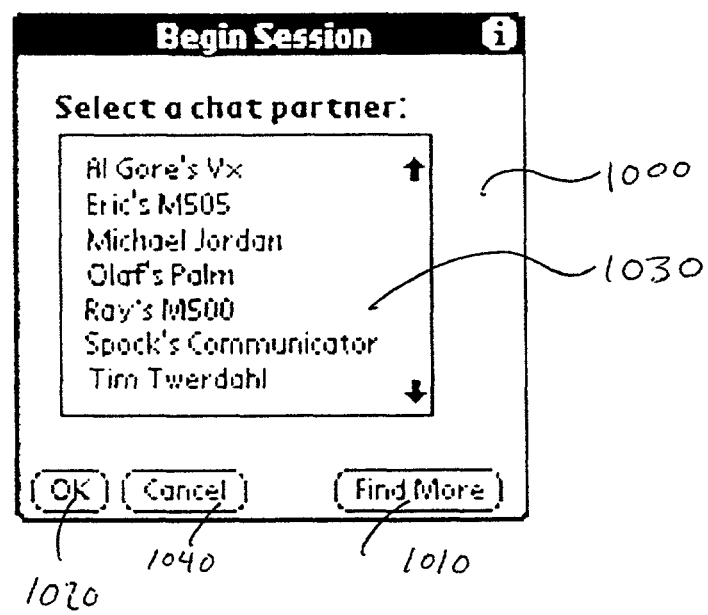
FIG. 10 shows a connect dialog, according to an embodiment of the present invention.

FIG. 10 shows a connect dialog 1000, according to an embodiment of the present invention. If chat software is being run for the first time and/or there is no stored list of recent contributors, tapping chat button 910 may cause embodiments of the present invention to discover all Bluetooth-enabled hand held computers within range. The potential partners discovered may be displayed in share with partners dialog 1100 as shown in FIG. 11, according to an embodiment of the present invention.

If the host device has previously participated in a collaborative communication session using embodiments of the present invention, connect dialog 1000 may display a list of their recent partners 1030. This speeds the setup process when consistently working with a small group, as the Bluetooth discovery process is not needed.

Tapping on any user on the list 1030, and then tapping OK button 1020 may begin the Bluetooth connection process.

Tapping Cancel button 1040 may return the user to the main screen (FIG. 9) without initiating a Bluetooth connection. Tapping Find More button 1010 may not use the list of recent partners, but rather may execute a Bluetooth single discovery procedure, displaying the discovery results in the list 1030.

After the OK button 1020 is tapped, embodiments of the present invention may attempt to connect to the selected partner. If the host selects a partner that does not have chat software installed on their hand held computer, an error dialog 1100 illustrated in FIG. 11 alerts the host that the potential partner does not have the proper software installed.

Figure 12:
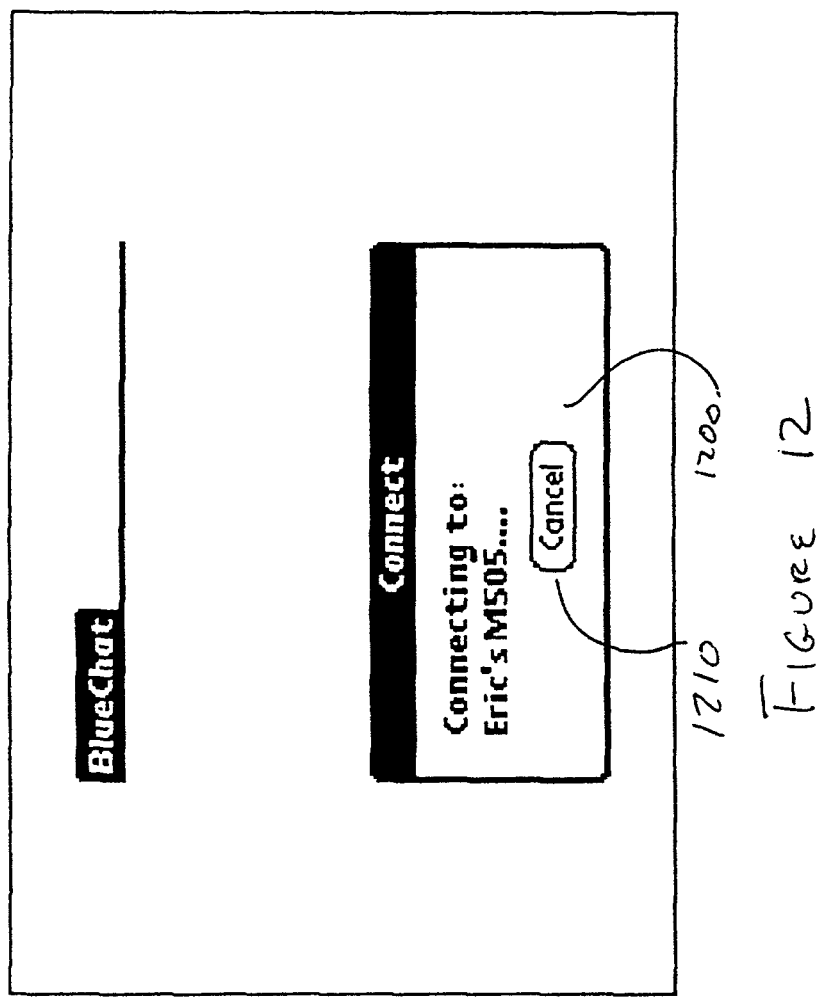
FIG. 12 shows a connecting dialog, according to an embodiment of the present invention.

Assuming that the potential partner has the proper software installed on their handheld, a connecting dialog 1200 as shown in FIG. 12 may be displayed. The connection process prepares to establish a point to point Bluetooth connection with that partner.

If the host taps the Cancel button 1210, the connection process to that partner may be aborted and the host may be returned to the main screen illustrated in FIG. 9. Any other chat sessions that are in progress may be preserved.

Figure 13:
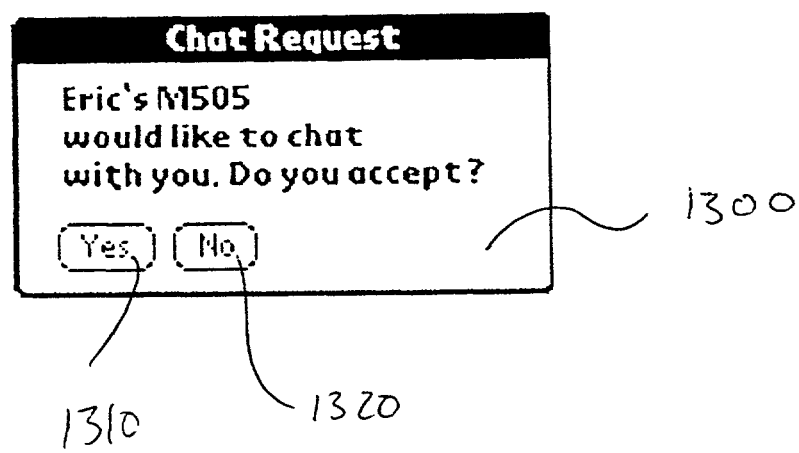
FIG. 13 illustrates a partner invitation dialog, according to an embodiment of the present invention.

FIG. 13 illustrates a chat request dialog 1300, according to an embodiment of the present invention. If the invited partner taps the Yes button 1310, they may be added to the host's chat session and they may begin collaborating immediately with the connected partner.

Figure 14:
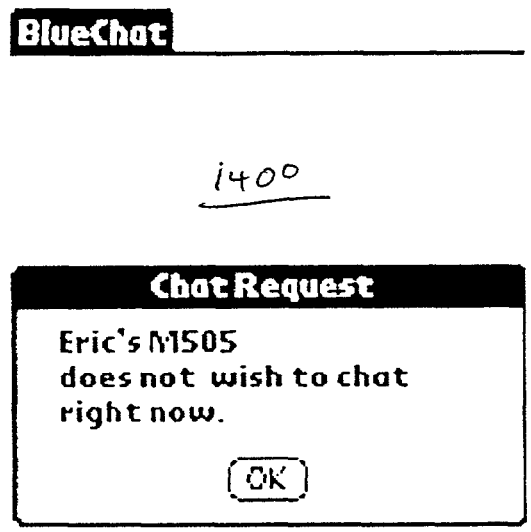
FIG. 14 illustrates a decline message, according to an embodiment of the present invention.

If the invited partner taps the No button 1320, the dialog is dismissed and they return to the application they were previously using. The host may receive a message letting them know that the invited partner has declined. FIG. 14 illustrates a decline message 1400, according to an embodiment of the present invention.

Figure 15:
FIG. 15 illustrates a received blocking message, according to an embodiment of the present invention.

If the invited partner has blocking enabled or their chat partner list is already full, the host unit may display a dialog informing the user that the partner is not currently accepting chat requests. FIG. 15 illustrates a received blocking message 1500, according to an embodiment of the present invention.

Figure 16:
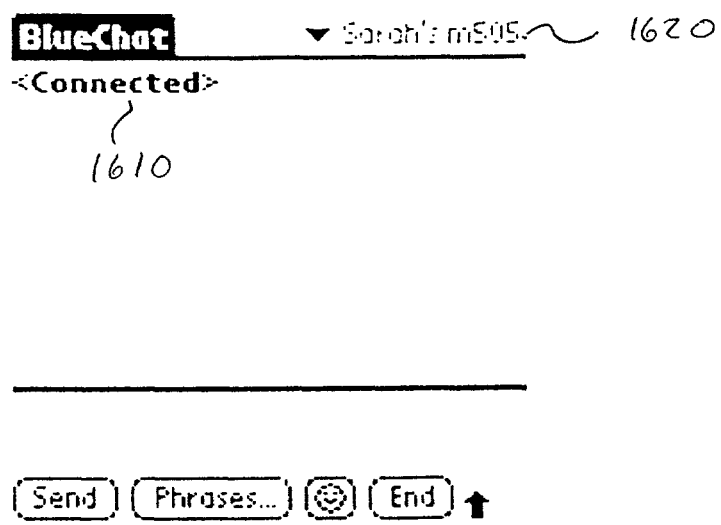
FIG. 16 illustrates a connected message, according to an embodiment of the present invention.

Once connected to a partner, the text "<Connected>" 1610 as shown in FIG. 16 may be displayed, according to an embodiment of the present invention. An initial chat message (not shown), if any, may appear underneath <Connected> text 1610.

In accordance with embodiments of the present invention, <Connected> text 1610 and other text messages may disappear from the screen 100 as additional chat messages are added and the messages are scrolled up. Each user also may see their chat partner's Bluetooth friendly name 1620 in the upper right-hand corner. The name 1620 may appear in a unique color associated with that specific partner to visually tie it to the text that appears in the active area.

Figure 17:
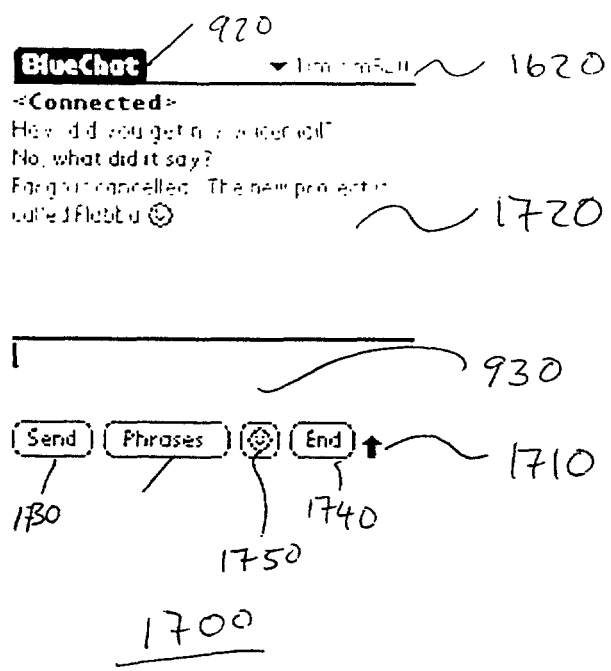
FIG. 17 illustrates functional areas of a Main screen display, according to an embodiment of the present invention.

FIG. 17 illustrates functional areas of a Main screen display 1700, according to an embodiment of the present invention. Graffiti shift indicator 1710 may be shown at the start of every new chat message to indicate that the first letter will be automatically capitalized, and then disappears until brought up again by a Graffiti stroke.

Active area 1720 may display the text messages and graphics that are being sent between the host and a partner. When the host and partner exchange text messages, these messages appear on individual lines with line breaks separating them. If the number of text lines exceeds the size of the visible active area, a vertical scroll bar may appear. The chat text in the active area may automatically scroll so that the last line always sits at the bottom of the active area. This scrolling permits the maximum view of the chat history.

Depending on the user preferences, a descriptive name will appear in front of the text that the host's partner types. By default, embodiments of the present invention do not display this information. If displayed, the format "<user>:<message>" may be used.

Regardless of how a chat is disconnected (End versus communications break), the text of the chat may remain available until the user switches to another partner (if any) in the chat application.

Embodiments of the present invention may send the connection information presenting in Table 1 to both the host and the chat partner via the active area. Each message may be bracketed with the characters "<>".

TABLE 1

| Message | What the message means |
| --- | --- |
| <Connected> | Indicates to both users that the chat session has begun |
| <"user name"> disconnected | Alerts both users that the indicated |

TABLE 1-continued

| Message | What the message means |
| --- | --- |
| <Lost connection> | user has ended this chat session If a user moves out of range or the connection is dropped due to interference or other problem. |

Input area 930 displays text messages and graphics that are being entered before they are sent to the other user and displayed in the Active Area 1720. Text input received from Graffiti stroke recognition, an on-screen keyboard, or external input devices may be displayed here. Graphics added to the text message by the user may be added to the end of the currently displayed message in the input area.

The Send button 1730 may take the current text/graphic message in the input area and send it to communications partner. The message may then be displayed in the active area of both devices.

When either one of the users taps the End button 1740 or the connection is dropped, the Send button 1730 may be changed to a Chat button 910.

Figure 18:
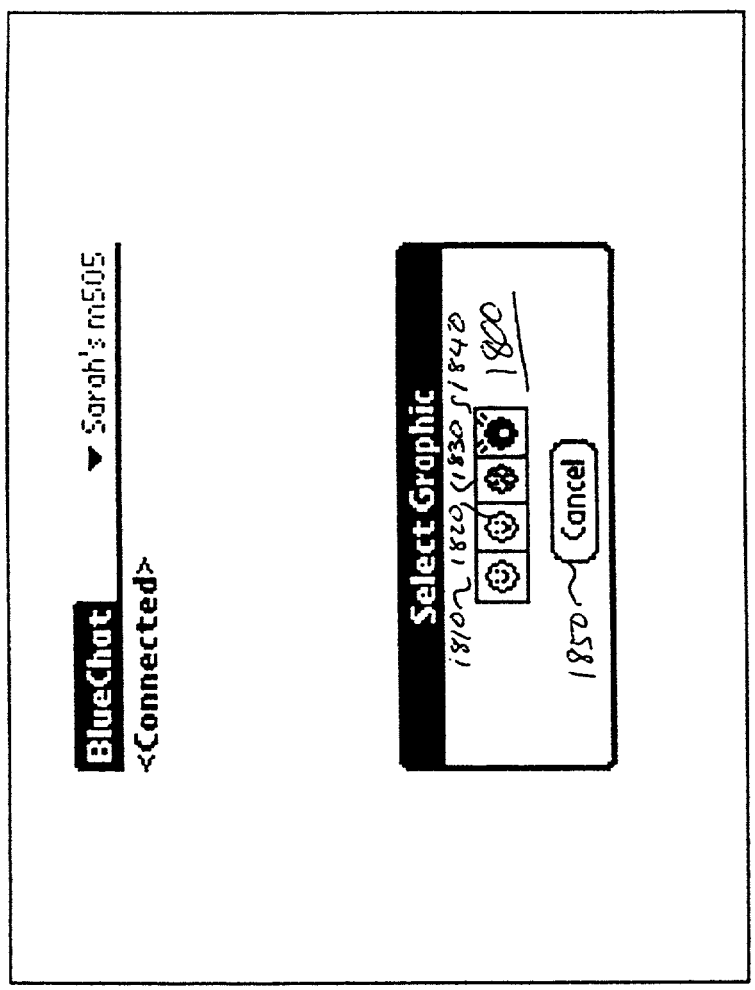
FIG. 18 illustrates a select graphics dialog, according to an embodiment of the present invention.

FIG. 18 illustrates a select graphics dialog 1800, according to an embodiment of the present invention. Tapping the graphic button 1750 of main display 1700 (FIG. 17) may display graphics dialog 1800.

Tapping on any of the available graphical symbols 1810-1840 may append them to the end of the text message currently typing being entered in the input area. Tapping the Cancel button 1850 may dismiss the dialog without adding any graphics to the input area.

Figure 19:
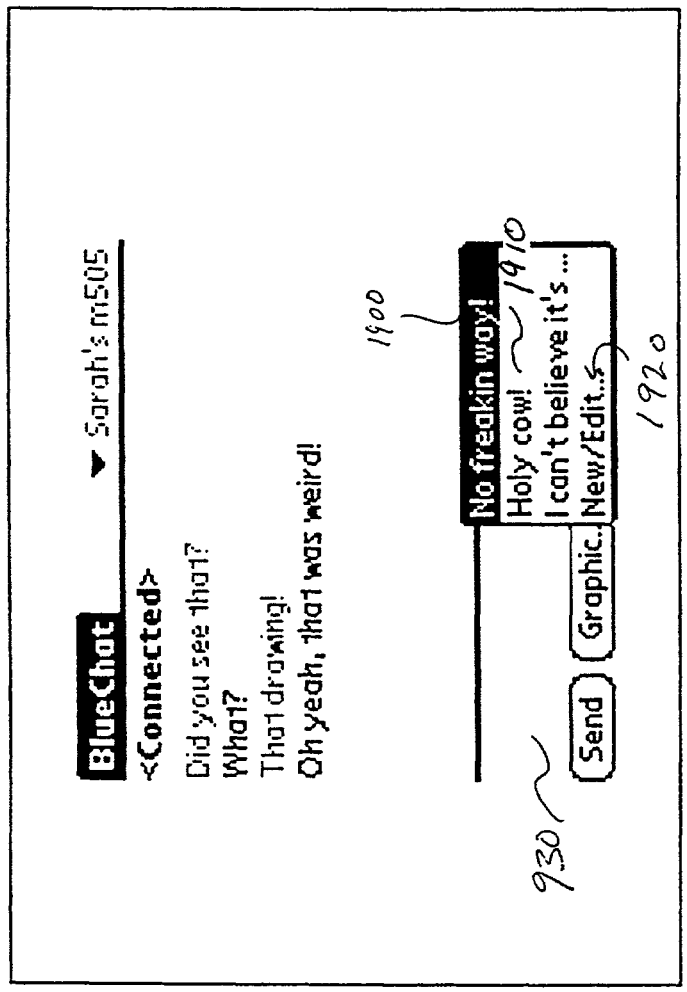
FIG. 19 illustrates a frequent phrase menu, according to an embodiment of the present invention.

FIG. 19 illustrates a frequent phrase menu 1900, according to an embodiment of the present invention. The frequent phrase pull down menu 1900 may be located in the upper right section of the input area. It is designed to store frequently entered phrases, decreasing text input time for the user.

Tapping on any of the phrases, for example phrase 1910, in the pull down menu may dismiss the menu and immediately adds the selected phrase to the input area 930.

Figure 20:
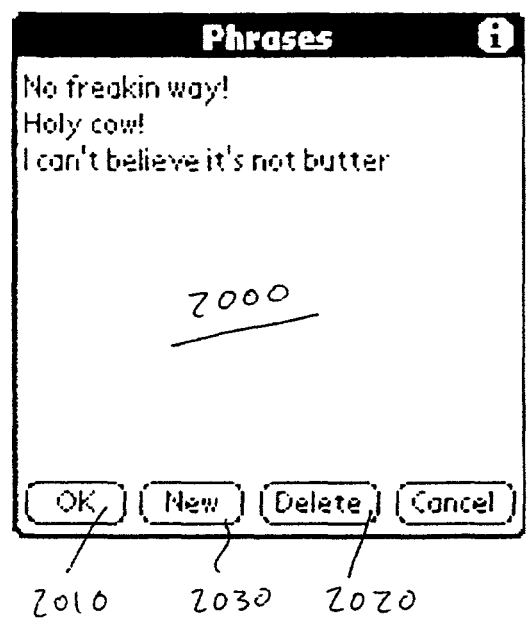
FIG. 20 illustrates a Phrases dialog, according to an embodiment of the present invention.

FIG. 20 illustrates a Phrases dialog 2000, according to an embodiment of the present invention. Tapping on the New/Edit . . . menu item 1920 (FIG. 19) in phrase menu 1900 may display the Phrases dialog 2000.

Tapping the OK button 2010 may dismiss the Phrases dialog 2000 and update the pull down menu 1900 data structure with any changes made while the user was in the Phrases dialog 2000.

Tapping the Delete button 2020 may remove the selected phrase from the list. If a user has not selected a phrase, this button may not perform an action.

Tapping the New button 2030 may display a New Phrase dialog. FIG. 21 illustrates a new phase dialog 2100, according to an embodiment of the present invention.

Figure 22:
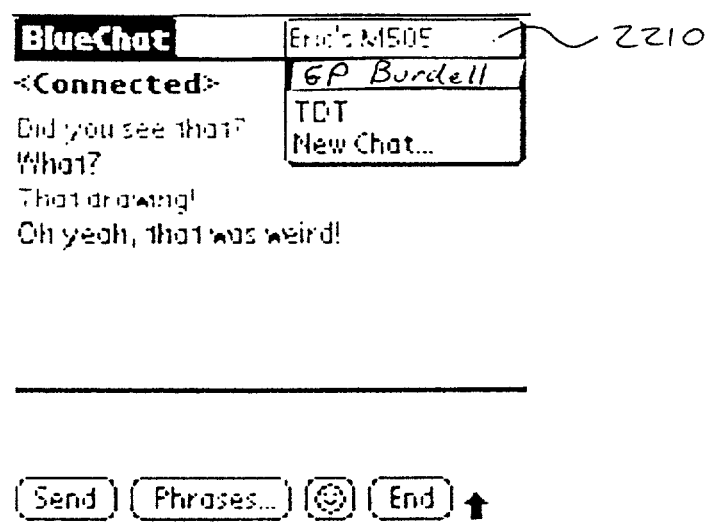
FIG. 22 illustrates a chat partner pull down display, according to an embodiment of the present invention.

FIG. 22 illustrates a chat partner pull down display 2210, according to an embodiment of the present invention. Chat partner pull down display 2210 lists the users currently connected to the host device. To allow the host to move between several discussions, chat partner pull down display 2210 may be displayed in the upper right corner showing the friendly name for each device.

If a new chat message is sent from another partner besides the current partner, a flashing indicator (not shown) may be displayed which shows that a new message awaits. An indicator (not shown) may be added to the area to the left of the current chat partner. A communication partner symbol (not shown) may be indicated next to the partner name in chat partner pull down display 2210. The user may select the partner with the new message indicator to make that chat session the current session, see the message and respond.

According to embodiments of the present invention, the graphics of flashing indicator 2230 and communication partner symbol 2220 may be identical, to aid user recognition of the event reporting.

Blocking allows a user to prevent other collaborative chat software users from sending unsolicited collaborative chat software partnering requests to them.

Figure 23:
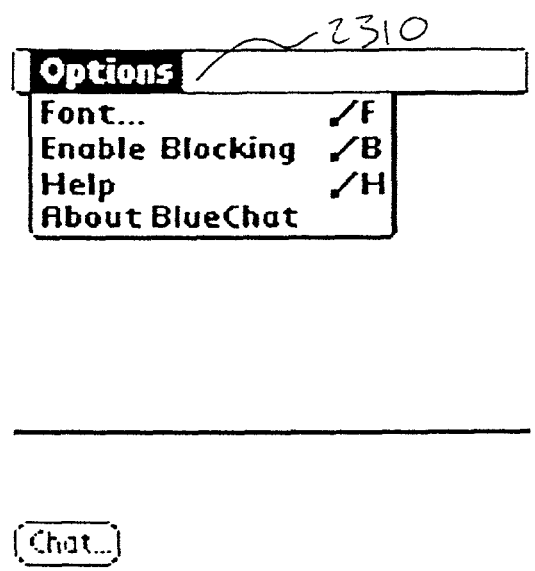
FIG. 23 shows an options menu, according to an embodiment of the present invention.

FIG. 23 shows an options menu 2310 including a blocking menu item, according to an embodiment of the present invention. Blocking is accomplished by a menu toggle. The two choices may be "Enable Blocking" and "Disable Blocking." The default is to disable blocking, that is, to allow requests. Menu 2310 depicts that requests are to be blocked.

Figure 24:
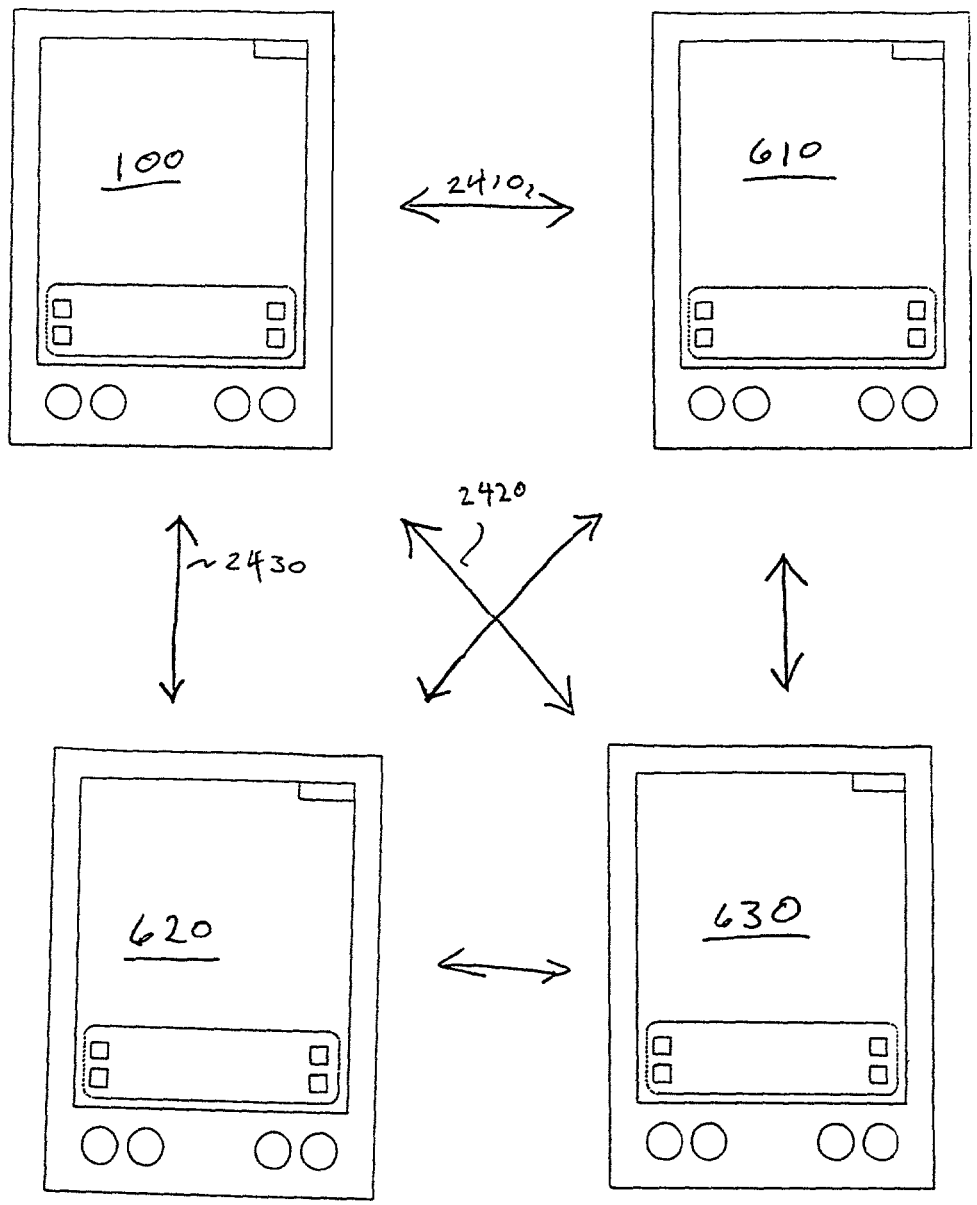
FIG. 24 illustrates a communication between four Bluetooth-enabled hand held computer systems, according to an embodiment of the present invention.

FIG. 24 illustrates a communication between four Bluetooth-enabled hand held computer systems, 100, 610, 620 and 630, according to an embodiment of the present invention.

Communication information entered on any device, for example Bluetooth-enabled hand held computer system 100 may be wirelessly communicated to other members of the group. Wireless communication 2410 is depicted between system 100 and system 610. Wireless communication 2430 is depicted between system 100 and system 620. Wireless communication 2420 is depicted between system 100 and system 630. In this manner, wireless hand held system 100 may chat with other wireless capable hand held computer systems.

The preferred embodiment of the present invention a system and method for N-way interactive communication using hand held computers is thus described. While the present invention has been described in particular embodiments, it should be appreciated that the present invention should not be construed as limited by such embodiments, but rather construed according to the below claims.

What is claimed is:

1. A method of providing a graphical user interface on a computer device of a user, the method comprising:
    a) establishing a first direct wireless communications free of intermediate devices between the computing device of the user and a first set of computing devices, wherein establishing the first direct wireless communications includes initiating a communication software on the computing device of the user, the communication software displaying a graphical user interface to enable the user to exchange chat messages and identification information with the first set of computing devices;
    b) establishing a second direct wireless communications free of intermediate devices between the computing device of the user and a second set of computing devices;
    c) exchanging chat messages and identification information between the computing device of the user and one or more computing devices of the first set of computing devices over the first direct wireless communications;
    d) exchanging chat messages and identification information between the computing device of the user and one or more computing devices of the second set of computing devices over the second wireless communications;
    e) generating, as part of the graphical user interface, a first conversation image displaying the chat messages and identification information exchanged between the computing device of the user and the one or more computing devices of the first set of computing devices; and
    f) displaying a selectable interface feature as part of the graphical user interface which, in response to user selection, replaces the first conversation image with a second conversation image displaying the chat messages and identification information exchanged between the computing device of the user and one or more computing devices of the second set of computing devices.

2. A method as described in claim 1, wherein the first direct wireless communications and the second direct wireless communications are each compliant with a version of a Bluetooth protocol.

3. A method as described in claim 1, wherein each of the chat messages displayed on the first conversation image corresponds to a computing device of the first set of computing devices, and each of the chat messages displayed on the first conversation image is coded with a respective unique color that is associated with its corresponding computing device.

4. A method as described in claim 3, wherein the first conversation image comprises a color legend identifying the corresponding computing device of each chat massage.

5. A method as described in claim 1, wherein the first set of computing devices include hand held computer devices.

6. The method as described in claim 1, wherein generating the first conversation image is performed in real time.

7. The method as described in claim 1, wherein the computing device of the user is a host for the first set of computing devices, wherein the chat messages displayed on the first conversation image include one or more messages by the user, and wherein the one or more messages include a visual indicator which indicates that the user is the host.

8. The method as described in claim 7, wherein the visual indicator is changeable by a legend indicating the visual indicator.

9. A method of identifying a source of a communication on a first portable computer device, performed by one or more processors, and comprising:
 a) establishing a first direct wireless communications free of intermediate devices between the first portable computer device and a first set of portable computer devices, wherein establishing the first direct wireless communications includes initiating a communication software on the first portable computer device, the communication software displaying a graphical user interface to enable a user of the first portable computer device to exchange chat messages and identification information with the first set of portable computer devices;
 b) establishing a second direct wireless communications free of intermediate devices between the first portable computer device and a second set of portable computer devices;
 c) exchanging chat messages and identification information between the first portable computer device and one or more portable computer devices of the first set of portable computer devices over the first direct wireless communications;
 d) exchanging chat messages and identification information between the first portable computer device and one or more computing devices of the second set of portable computer devices over the second wireless communications;
 e) automatically assigning a color to each member of the first set of portable computer devices and second set of portable computer devices; and
 f) generating, as part of the graphical user interface, a first record displaying chat messages and identification information exchanged between the first portable computer device and one or more portable computer devices of the first set of portable computer devices via the first direct wireless communication, wherein the chat messages and identification information received from a member of the first direct wireless communication is displayed in a respective assigned color; and
 g) displaying a selectable interface feature as part of the graphical user interface which, in response to user selection, replaces the first record with a second record displaying the chat messages and identification information exchanged between the first portable computer device and one or more computing devices of the second set of portable computer devices.

10. The method as described in claim 9, wherein the chat messages and identification information received from a member of the first direct wireless communication are graphical information.

11. The method as described in claim 9, wherein the chat messages and identification information received from a member of the first direct wireless communication are alphanumeric information.

12. The method as described in claim 9, wherein the first portable computer device is a host for the first set of portable computing devices, wherein the chat messages displayed on the first record include one or more messages by the first portable computer device, and wherein the one or more messages include a visual indicator which indicates that the first portable computer device is the host.

13. The method as described in claim 12, further comprising generating the first record in real time.

14. The method as described in claim 9, wherein each of the assigned colors is referenced by a color legend user interface.

15. The method, as described in claim 9, wherein each of the assigned colors is changeable by a color legend user interface.

16. The method, as described in claim 9, wherein the first direct wireless communication and the second direct wireless communication each are Bluetooth wireless connections.

17. A non-transitory computer-readable medium storing instruction that, when executed by a processor, cause the processor to perform operations comprising:
 a) establishing a first direct wireless communications free of intermediate devices between the computing device of a user and a first set of computing devices and the first set of computing devices, wherein establishing the first direct wireless communications includes initiating a communication software on the computing device of the user, the communication software displaying a graphical user interface to enable the user to exchange chat messages and identification information with the first set of computing devices;
 b) establishing a second direct wireless communications free of intermediate devices between the computing device of the user and a second set of computing devices;
 c) exchanging chat messages and identification information between the computing device of the user and one or more computing devices of the first set of computing devices over the first direct wireless communications;
 d) exchanging chat messages and identification information between the computing device of the user and one or more computing devices of the second set of computing devices over the second wireless communications;
 e) generating, as part of the graphical user interface, a first conversation image displaying the chat messages and identification information exchanged between the computing device of the user and the one or more computing devices of the first set of computing devices; and
 f) displaying a selectable interface feature as part of the graphical user interface which, in response to user selection, replaces the first conversation image with a second conversation image displaying the chat messages and identification information exchanged between the computing device of the user and one or more computing devices of the second set of computing devices.

18. The non-transitory computer-readable medium as described in claim 17, wherein the instructions cause the processor to generate the first conversation image in real time.

19. The non-transitory computer-readable medium as described in claim 17, wherein, in the first conversation image, chat messages associated with the first computing device are displayed in a color associated with the computing device of the user.

20. The non-transitory computer-readable medium as described in claim 19, wherein the color is changeable by a color legend user interface.

21. The non-transitory computer-readable medium as described in claim 17, wherein each portable computer system of said first set of computing devices is associated with a unique color for its respective chats in the first conversation image.

22. The non-transitory computer-readable medium as described in claim 17, wherein the computing device of the user is a host for the first set of computing devices, wherein the chat messages displayed on the first conversation image include one or more messages by the user, and wherein the one or more messages include a visual indicator which indicates that the user is the host.

\* \* \* \* \*